United States Patent
Osono et al.

(10) Patent No.: US 9,803,056 B2
(45) Date of Patent: Oct. 31, 2017

(54) METHOD OF MANUFACTURING CROSSLINKED FLUORORESIN POWDER

(71) Applicant: HITACHI METALS, LTD., Tokyo (JP)

(72) Inventors: Kazumasa Osono, Hitachi (JP); Hiroo Kusano, Hitachi (JP); Tomoyuki Nishio, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/062,704

(22) Filed: Mar. 7, 2016

(65) Prior Publication Data
US 2016/0264738 A1 Sep. 15, 2016

(30) Foreign Application Priority Data

Mar. 10, 2015 (JP) ................. 2015-047180

(51) Int. Cl.
| | |
|---|---|
| *C08F 2/46* | (2006.01) |
| *C08F 2/50* | (2006.01) |
| *C08G 61/04* | (2006.01) |
| *C08J 3/28* | (2006.01) |
| *C08J 3/20* | (2006.01) |
| *C08J 3/24* | (2006.01) |

(52) U.S. Cl.
CPC ................ *C08J 3/28* (2013.01); *C08J 3/203* (2013.01); *C08J 3/24* (2013.01); *C08J 3/247* (2013.01); *C08J 2327/18* (2013.01)

(58) Field of Classification Search
CPC ........... C08J 3/28; C08J 3/247; C08J 2327/18

USPC ......... 522/156, 155, 150, 1, 161, 157; 520/1
See application file for complete search history.

(56) References Cited

U.S. PATENT DOCUMENTS

| | | | | |
|---|---|---|---|---|
| 2003/0104930 | A1* | 6/2003 | Osawa | ..................... B01J 21/20 502/159 |
| 2004/0082701 | A1* | 4/2004 | Ota | .......................... C08F 8/00 524/474 |
| 2012/0053297 | A1 | 3/2012 | Nakagawa et al. | |
| 2016/0062257 | A1* | 3/2016 | Sugahara | ............. G03G 9/1133 430/111.35 |

FOREIGN PATENT DOCUMENTS

| | | |
|---|---|---|
| EP | 0 507 286 A1 | 10/1992 |
| EP | 0507286 | * 10/1992 |
| JP | 2002-317055 A | 10/2002 |
| JP | 2002-321216 A | 11/2002 |
| JP | 2006-2034 A | 1/2006 |

OTHER PUBLICATIONS

Hirokazu et al, Oct. 7, 1992, EP 0507286.*
Extended European Search Report, Jul. 27, 2016, 8 pages.

* cited by examiner

*Primary Examiner* — Jessica E Whiteley
(74) *Attorney, Agent, or Firm* — Foley & Lardner LLP

(57) ABSTRACT

A method of manufacturing a crosslinked fluororesin powder includes forming a powder mixture by mixing a fluororesin powder as a first powder with a second powder not fusing to the fluororesin powder even under conditions for crosslinking of the fluororesin powder, and conducting a cross-linking treatment to the formed powder mixture.

12 Claims, 6 Drawing Sheets

METHOD OF MANUFACTURING CROSSLINKED FLUORORESIN POWDER

The present application is based on Japanese patent application No. 2015-047180 filed on Mar. 10, 2015, the entire contents of which are incorporated herein by reference.

BACKGROUND OF THE INVENTION

1. Field of the Invention

The invention relates to a method of manufacturing a crosslinked fluororesin powder.

2. Description of the Related Art

A crosslinked fluororesin in powder form (i.e., a crosslinked fluororesin powder) is increasingly demanded due to excellent characteristics thereof for use in e.g. machine parts such as a sliding component.

A method of manufacturing the crosslinked fluororesin powder is known in which a non-crosslinked fluororesin powder is firstly formed into a mat or sheet shape and is then crosslinked by exposure to radiation at a predetermined dose in a low-oxygen gas atmosphere while being heated to a temperature slightly above the melting point of the fluororesin, and the crosslinked fluororesin sheet is cooled down to room temperature and then pulverized into a powder by a pulverizer mill, thereby obtaining a crosslinked fluororesin powder having a predetermined particle size (see e.g., JP-A-2002-321216).

SUMMARY OF THE INVENTION

The fluororesin after crosslinking, however, increases in viscosity and is thus difficult to pulverize into the powder, especially into a fine powder, by the known method.

Furthermore, for the varied applications of crosslinked fluororesin powder, the crosslinked fluororesin powder may need to have a finer particle size (e.g., an average particle size of not more than 20 μm).

It is an object of the invention to provide a method of manufacturing a crosslinked fluororesin powder that allows obtainment of a crosslinked fluororesin powder having a fine particle size (e.g., an average particle size of not more than 20 μm).

According to an embodiment of the invention, a method of manufacturing a crosslinked fluororesin powder as set forth in [1] to [9] below is provided.

[1] A method of manufacturing a crosslinked fluororesin powder, comprising:
forming a powder mixture by mixing a fluororesin powder as a first powder with a second powder not fusing to the fluororesin powder even under conditions for crosslinking of the fluororesin powder; and
conducting a cross-linking treatment to the formed powder mixture.

[2] The method according to [1], further comprising separating the first powder and the second powder after the cross-linking treatment.

[3] The method according to [1] or [2], wherein the second powder comprises a powder soluble in an organic solvent and/or an inorganic solvent.

[4] The method according to [1] or [2], wherein the second powder comprises a magnetic material.

[5] The method according to [1] or [2], wherein the specific gravity of the second powder is not less than double or not more than half the specific gravity of the first powder.

[6] The method according to any one of [1] to [5], wherein the second powder has a smaller average particle size than the first powder, and wherein a mixture ratio (or volume ratio) of the second powder to the first powder is not less than 2 in a ratio of the second powder/the first powder.

[7] The method according to any one of [1] to [5], wherein the second powder has a larger average particle size than the first powder, and wherein a mixture ratio (or volume ratio) of the second powder to the first powder is not less than 2 in a ratio of the second powder/the first powder.

The method according to any one of [1] to [7], wherein the powder mixture is formed into a tablet shape before the cross-linking treatment.

The method according to any one of [1] to [8], wherein the fluororesin powder comprises a powder with an average particle size of not more than 15 μm.

Effects of the Invention

According to an embodiment of the invention, a method of manufacturing a crosslinked fluororesin powder can be provided that allows obtainment of a crosslinked fluororesin powder having a fine particle size (e.g., an average particle size of not more than 20 μm).

BRIEF DESCRIPTION OF THE DRAWINGS

Next, the present invention will be explained in more detail in conjunction with appended drawings, wherein:

FIGS. 4A and 4B are illustration diagrams showing how to calculate a mixture ratio of a second powder to a first powder in the method of manufacturing a crosslinked fluororesin powder in the embodiment of the invention, wherein FIG. 4A shows the situation that particles of the second powder surrounding particles of the first powder are shared between adjacent particles of the first powder and FIG. 4B shows the situation that adjacent particles of the first powder are separately surrounded by different particles of the second powder.

DETAILED DESCRIPTION OF THE PREFERRED EMBODIMENTS

The method of manufacturing a crosslinked fluororesin powder in the embodiment of the invention will be described below in reference to the drawings.

Figure 1:
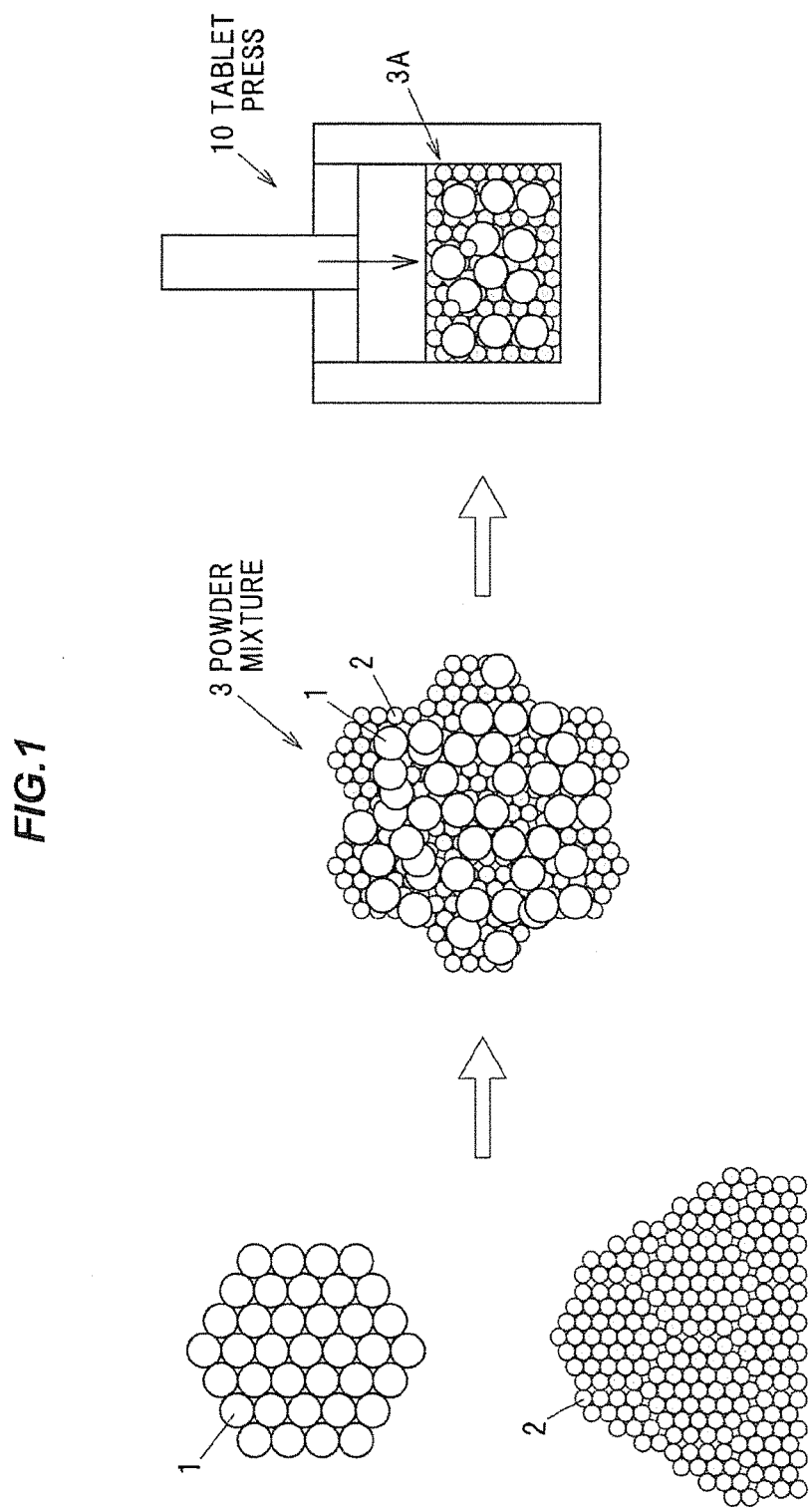
FIG. 1 is an illustration diagram schematically showing a mixing step and a shaping step in a method of manufacturing a crosslinked fluororesin powder in an embodiment of the present invention.

FIG. 1 is an illustration diagram schematically showing a mixing step and a shaping step in the method of manufacturing a crosslinked fluororesin powder in the embodiment of the invention.

The method of manufacturing a crosslinked fluororesin powder in the embodiment of the invention includes a step in which a powder mixture 3 is formed by mixing a fluororesin powder 1 as a first powder with a second powder 2 not fusing (or adhering) to the fluororesin powder 1 even under the conditions for crosslinking of the fluororesin powder 1, and the powder mixture 3 is then crosslinked.

First Powder

The fluororesin powder 1 as the first powder is non-crosslinked fluororesin powder. The fluororesin is not specifically limited and it is possible to use, e.g., polytetrafluoroethylene (PTFE), tetrafluoroethylene perfluoroalkyl vinyl ether copolymer (PFA) and tetrafluoroethylene-hexafluoropropylene copolymer (FEP), etc. It is desirable to use polytetrafluoroethylene (PTFE). It is possible to combine two or more types.

A powder having a particle size not larger than a final particle size is desirably used as the fluororesin powder 1. To obtain a crosslinked fluororesin powder having an average particle size of, e.g., not more than 20 μm, a fluororesin powder having an average particle size of not more than 20 μm is used. In the present embodiment, it is possible to use not only a fluororesin powder having an average particle size of not more than 20 μm but also a fluororesin powder of not more than 15 μm, and furthermore, a fluororesin powder of not more than 10 μm. The lower limit is not specifically limited and it is possible to use a fluororesin powder having an average particle size of, e.g., 1 μm. Since the average particle size after crosslinking is often more or less larger, a fluororesin powder having an average particle size smaller than the final average particle size is desirably used as a raw material. The average particle size mentioned in the present embodiment means a particle diameter at 50% in the cumulative particle size distribution.

Second Powder

The second powder has the property of not fusing (or adhering) to the fluororesin powder 1 even under the conditions for crosslinking of the fluororesin powder 1. Thus, it is possible to easily separate the fluororesin powder 1 from the second powder 2 in the separation step (described later). In detail, the second powder 2 has such heat resistance as to be stable and not fuse to the fluororesin powder 1 even at a crosslinking temperature, and also has such resistance to radiation as to be stable and not fuse/crosslink to the fluororesin powder 1 even under exposure to radiation during the crosslinking. Since the presence of the second powder 2 during the crosslinking process allows cohesion or crosslinking of particles of the fluororesin powder 1 to be suppressed, it is possible to suppress an increase in the average particle size of a crosslinked fluororesin powder 1A after crosslinking.

The second powder 2 is preferably, e.g., a powder soluble in an organic solvent and/or an inorganic solvent, a magnetic powder, or a powder having a specific gravity which is not less than double or not more than half the specific gravity of the fluororesin powder 1.

As the powder soluble in an organic solvent and/or an inorganic solvent, for example, grain salt (hereinafter, referred to as "salt") soluble in water or alcohol, etc., and silica powder soluble in hydrofluoric acid are suitable.

As the magnetic powder (ferromagnetic powder), for example, ferrite powder and iron power are suitable.

As the powder having a specific gravity which is not less than double or not more than half the specific gravity of the fluororesin powder 1, for example, iron powder and salt are suitable.

Mixing Step

In the method of manufacturing a crosslinked fluororesin powder in the embodiment of the invention, firstly, the powder mixture 3 is obtained by mixing the fluororesin powder 1 as the first powder with the second powder 2, as shown in FIG. 1 (the drawings on the left and in the middle).

The mixed state is desirably such that each individual particle of the fluororesin powder 1 is surrounded by particles of the second powder 2 and the particles of the fluororesin powder 1 have as little contact with each other as possible.

To achieve this, in case that the second powder 2 has a smaller average particle size than the first powder 1, a mixture ratio (volume ratio) of the second powder 2 to the first powder 1 (the second powder 2/the first powder 1) is desirably not less than 2, more desirably, not less than 4. On the other hand, in case that the second powder 2 has a larger average particle size than the first powder 1, the mixture ratio (volume ratio) of the second powder 2 to the first powder 1 (the second powder 2/the first powder 1) is desirably not less than 2, more desirably, not less than 8.

An example using a PTFE powder having an average particle size of 3 μm as the first powder 1 and salt having an average particle size of 1 μm as the second powder 2 will be described in reference to FIG. 4.

Figure 4A:
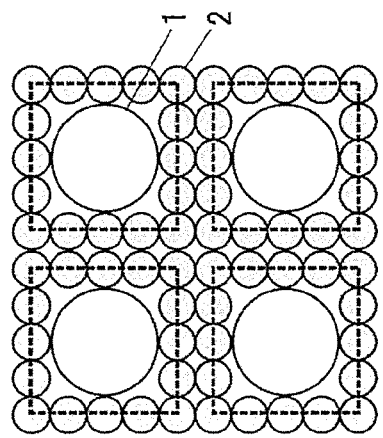
Figure 4B:
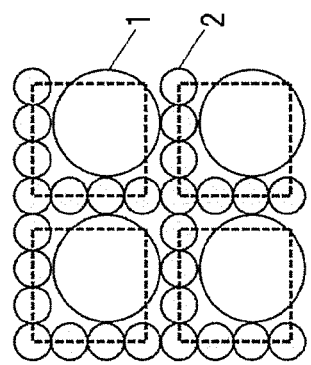

FIGS. 4A and 4B are illustration diagrams schematically showing how to calculate a mixture ratio of the second powder to the first powder in the method of manufacturing a crosslinked fluororesin powder in the embodiment of the invention. In the drawings, a dotted square indicates one unit of the powder mixture.

FIG. 4A shows the situation that particles of the second powder surrounding particles of the first powder are shared between adjacent particles of the first powder 1, and in this case, the volume ratio is the first powder 1:the second powder=1:3.6 based on the space-filling model. Therefore, in order to obtain an ideal form in which the entire circumference of each individual particle of the first powder is surrounded by the particles of the second powder, the second powder is mixed with not less than 3.6 times the volume of the first powder 1.

FIG. 4B shows the situation that adjacent particles of the first powder are separately surrounded by different particles of the second powder, and in this case, the volume ratio is the first powder 1:the second powder=1:8 based on the space-filling model. Therefore, in order to obtain an ideal form in which the entire circumference of each individual particle of the first powder is surrounded by the particles of the second powder, the second powder is mixed with not less than 8 times the volume of the first powder 1.

The likelihood of cohesion/crosslinking of the particles of the fluororesin powder 1 during the crosslinking process is lower in the embodiment shown in FIG. 4B than in than shown in FIG. 4A. Therefore, to obtain a crosslinked fluororesin powder having an average particle size close to that of a raw material, the second powder is mixed with not less than 8 times the volume of the first powder 1. On the other hand, when the efficiency of production is the priority, the second powder is mixed with about 3 to 4 times the volume of the first powder 1.

Shaping Step

Next, the powder mixture 3 is shaped preferably into a tablet form before crosslinking by using a tablet press 10, as shown in FIG. 1 (the drawing on the right). Since a tablet-shaped powder mixture 3A is easy to handle and can be continuously introduced into a crosslinking device, productivity increases. The shaping method is not specifically limited thereto. A granulator, etc., may be alternatively used.

The tablet shape in the present embodiment means not only the form of tablet commonly seen in pharmaceutical products (a column shape, a disc shape, a rugby ball shape) but also includes a troche shape with a hole in the middle of tablet (a ring shape) and a prism shape. When the thickness is too large, the crosslinking process takes a long time in case of exposure to radiation coming from above. Therefore, the thickness (height) is preferably not more than about 1 μm.

Crosslinking Step

Figure 2:
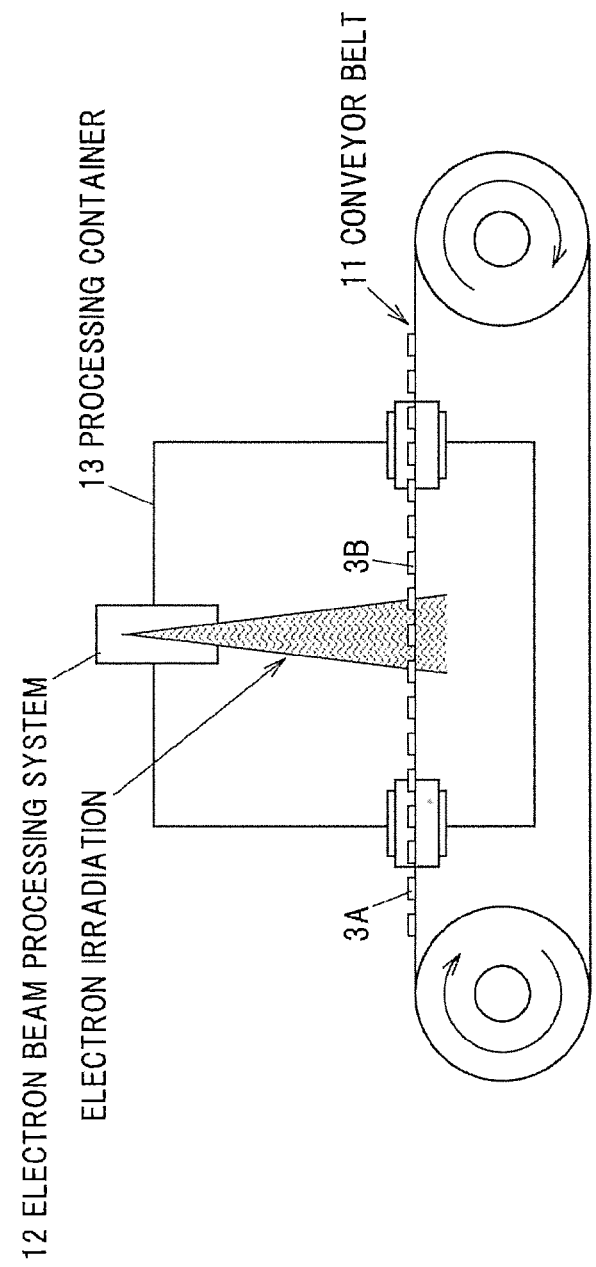
FIG. 2 is an illustration diagram schematically showing a crosslinking step in the method of manufacturing a crosslinked fluororesin powder in the embodiment of the invention.

After that, the powder mixture 3 is crosslinked using, e.g., a crosslinking device as shown in FIG. 2.

FIG. 2 is an illustration diagram schematically showing a crosslinking step in the method of manufacturing a crosslinked fluororesin powder in the embodiment of the invention.

The tablet-shaped powder mixture 3A is continuously carried by a conveyor belt 11 into a processing container 13 equipped with an electron beam processing system 12, is exposed to an electron beam, and is then discharged from the processing container 13 by the conveyor belt 11. A tablet-shaped crosslinked powder mixture 3B is thereby obtained.

The desirable crosslinking condition is exposure to ionizing radiation at an irradiation dose in a range of 0.1 kGy to 10 MGy in an oxygen-free atmosphere or in a low-oxygen atmosphere with about not more than 500 ppm oxygen in a state of being heated to not less than the melting point of the fluororesin powder 1. A gamma-ray, an electron beam, an X-ray, neutron radiation and a high-energy ion, etc., can be used as the ionizing radiation. Of those, the electron beam is preferable.

When using, e.g., PTFE as the fluororesin, exposure to ionizing radiation is desirably carried out in a state that the fluororesin powder 1 is heated to a temperature higher than 327° C. which is the crystalline melting point of the PTFE. Meanwhile, when using PFA or FEP, exposure to radiation is carried out after heating to a temperature higher than a crystalline melting point which is 300 to 315° C. for the former and 260 to 275° C. for the latter. In this regard, however, since excessive heating leads to scission and decomposition of molecular main-chain, the heating temperature should be maintained within a range of 10 to 30° C. higher than the crystalline melting point of the fluororesin.

Separation Step

After the crosslinking step, the first powder 1 is separated from the second powder 2 and the crosslinked fluororesin powder 1A is thereby obtained.

Figure 3:
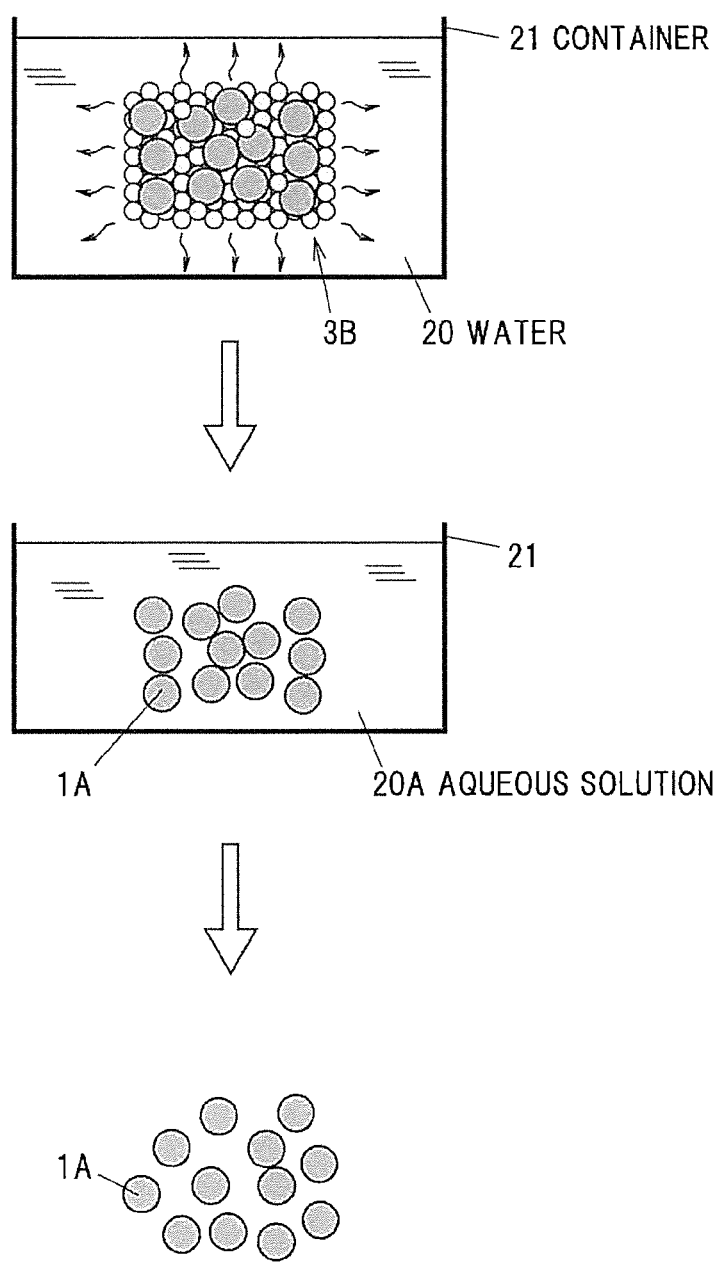
FIG. 3 is an illustration diagram schematically showing a separation step in the method of manufacturing a crosslinked fluororesin powder in the embodiment of the invention.

FIG. 3 is an illustration diagram schematically showing a separation step in the method of manufacturing a crosslinked fluororesin powder in the embodiment of the invention, and shows the embodiment in which powder (e.g., salt) having the property of dissolving in an organic solvent and/or an inorganic solvent is used as the second powder 2 (an enlarged view of only one tablet of the crosslinked powder mixture 3B is shown for easy understanding).

When the tablet-shaped crosslinked powder mixture 3B is introduced into a container 21 filled with water 20, the second powder 2 gradually dissolves in water (the top drawing in FIG. 3) and only the crosslinked fluororesin powder 1A is eventually left in an aqueous solution 20A (the middle drawing in FIG. 3). The crosslinked fluororesin powder 1A is extracted from the aqueous solution 20A and is then dried. The crosslinked fluororesin powder 1A having a desired average particle size is thereby obtained (the bottom drawing in FIG. 3).

In case that the particle size is larger than the desired average particle size due to cohesion/crosslinking of some particles of the fluororesin powder, it is possible to obtain the crosslinked fluororesin powder 1A having a desired average particle size by pulverization. In this case, even if some of the particles of the fluororesin powder cohere or crosslink to each other, it is possible to pulverize into fine powder since the second powder 2 serves as a barrier during the crosslinking and this allows the crosslinked fluororesin powder 1A to be pulverized into fine powder more easily than the powder crosslinked without the presence of the second powder 2.

When a magnetic powder (e.g., ferrite powder) is used as the second powder 2, it is possible to separate the second powder 2 from the tablet-shaped crosslinked powder mixture 3B using a magnet, etc., and it is thereby possible to obtain the crosslinked fluororesin powder 1A.

When a powder having a specific gravity which is not less than double or not more than half the specific gravity of the fluororesin powder 1 is used as the second powder 2, it is possible to separate the second powder 2 from the tablet-shaped crosslinked powder mixture 3B by a separation method using air or vibration, or by a dry-type specific gravity sorter, etc., and it is thereby possible to obtain the crosslinked fluororesin powder 1A.

The separation step can be omitted when it is not necessary to separate the first powder 1 from the second powder 2.

Effects of the Embodiment of the Invention

In the embodiment of the invention, it is possible to provide a method of manufacturing a crosslinked fluororesin powder by which it is possible to obtain a crosslinked fluororesin powder having a fine particle size (an average particle size of not more than 20 μm, particularly not more than 10 μm) which is difficult to obtain by the conventional method. In addition, in the present embodiment, it is possible to manufacture crosslinked fluororesin powders having various particle sizes, from a large particle size to a fine particle size.

The invention will be described in more detail in reference to Examples. However, the invention is not limited thereto.

EXAMPLES

Using a PTFE powder having an average particle size of 3 μm (product name: TFW-3000F, manufactured by Seishin Enterprise Co., Ltd.) as the first powder 1 and salt having an average particle size of 1 μm as the second powder 2, crosslinked fluororesin powders were made in accordance with the embodiment of the invention. The salt used was commercially-available common table salt (available from The Salt Industry Center of Japan) pulverized into 1 μm by a dry milling method (a hammermill was used here but a jet mill, etc., may be used).

In Example 1, a powder mixture was formed by mixing 1 part by mass of the first powder 1 (PTFE powder) with 1.8 parts by mass of the second powder 2 (salt) so that the mixture ratio (volume ratio) of the PTFE powder to the salt was the former:the latter=1:3.6, and the powder mixture was shaped into a tablet form and was then crosslinked (340° C., an oxygen-free atmosphere, an electron beam dose of 100 kGy).

In Example 2, a powder mixture was formed by mixing 1 part by mass of the first powder 1 (PTFE powder) with 4 parts by mass of the second powder 2 (salt) so that the mixture ratio (volume ratio) of the PTFE powder to the salt was the former:the latter=1:8, and the powder mixture was shaped into a tablet form and was then crosslinked (340° C., an oxygen-free atmosphere, an electron beam dose of 100 kGy).

Figure 5A:
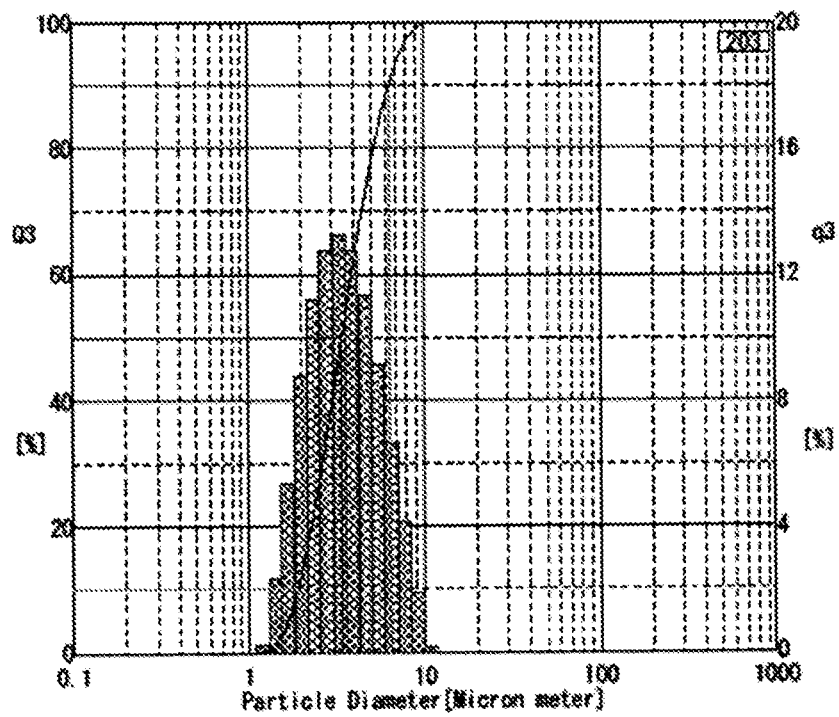
FIG. 5A is a graph illustrating a particle size distribution of the PTFE (raw material) sample of Table 1.
Figure 5B:
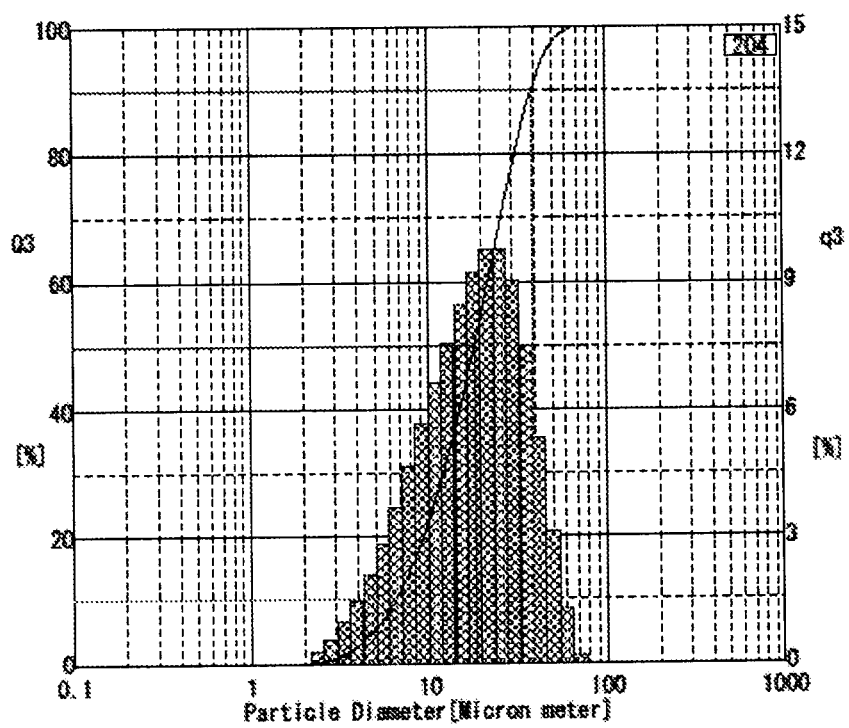
FIG. 5B is a graph illustrating a particle size distribution of Example 1 of Table 1.
Figure 5C:
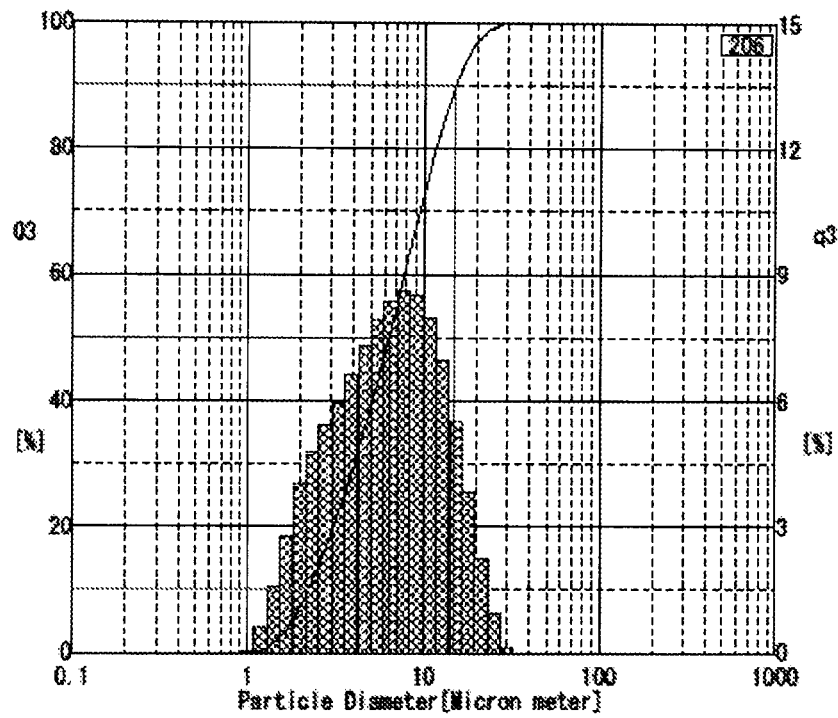
FIG. 5C is a graph illustrating a particle size distribution of Example 2 of Table 1.

After crosslinking, each tablet-shaped powder mixture was poured into alcohol to dissolve the second powder 2 (salt) in the alcohol, and particle-size distribution of the crosslinked fluororesin powder was measured using SEISHIN LMS-30 in a state that the crosslinked fluororesin powder was dispersed in the alcohol solvent. The measurement was also conducted on the PTFE powder as a raw material in the same manner. Table 1 and FIGS. 5A-5C show the results. In Table 1, D (10%) indicates a particle diameter at 10% in the cumulative particle size distribution, D (50%) indicates a particle diameter at 50% in the cumulative particle size distribution, and D (90%) indicates a particle diameter at 90% in the cumulative particle size distribution.

TABLE 1

|  | PTFE (raw material) | Example 1 | Example 2 |
|---|---|---|---|
| D (10%) | 1.9 μm | 6.5 μm | 2.2 μm |
| D (50%) | 3.4 μm | 18.3 μm | 6.4 μm |
| D (90%) | 6.4 μm | 38.8 μm | 15.1 μm |

Figure 5D:
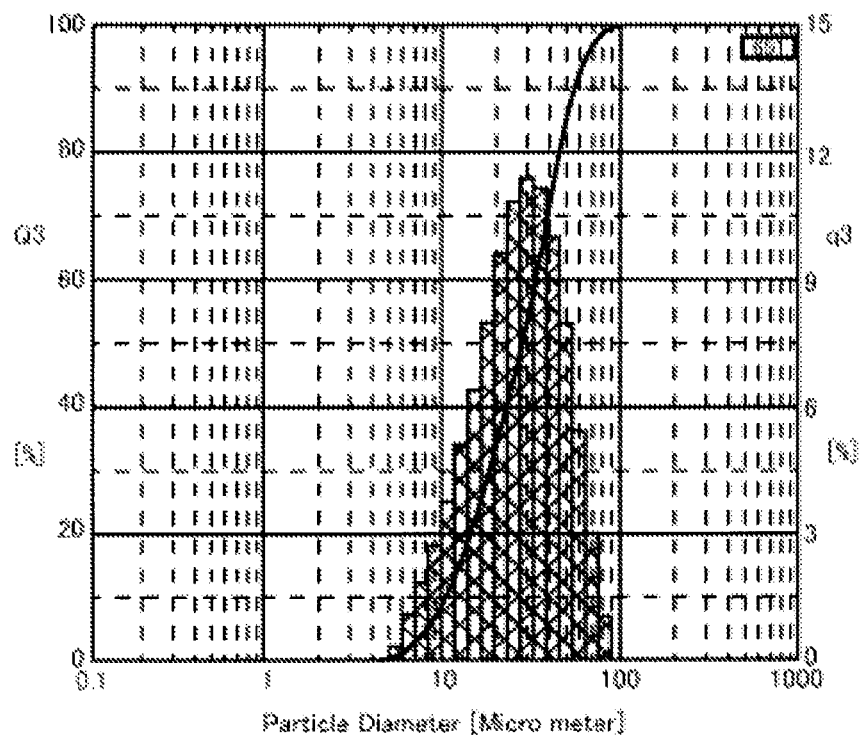
FIG. 5D is a graph illustrating a particle size distribution of Comparative Example 1 of Table 2.

Meanwhile, in Comparative Example 1, only the first powder 1 (PTFE powder) was shaped into a tablet form without mixing the second powder 2 (salt) and was crosslinked (340° C., an oxygen-free atmosphere, an electron beam dose of 100 kGy), and particle-size distribution was measured in the same manner as Examples 1 and 2. Table 2 and FIG. 5D show the results.

TABLE 2

|  | Comparative Example 1 |
|---|---|
| D (10%) | 12.0 μm |
| D (50%) | 27.8 μm |
| D (90%) | 54.0 μm |

As understood from Tables 1 and 2, crosslinked fluororesin powders having a fine particle size (an average particle size of not more than 20 μm) were obtained in Examples 1 and 2 according to the embodiment of the invention, but the crosslinked fluororesin powder in Comparative Example 1 had an average particle size of more than 20 μm even though the same PTFE powder as Examples was used. In addition, it was difficult to pulverize the crosslinked fluororesin powder in Comparative Example 1 into powder with a finer particle size as compared to the crosslinked fluororesin powders in Examples.

The invention is not intended to be limited to the embodiment and Examples, and the various kinds of modifications can be implemented.

What is claimed is:

1. A method of manufacturing a crosslinked fluororesin powder, comprising:
    forming a powder mixture by mixing a non-crosslinked fluororesin powder as a first powder with a second powder to provide a formed powder mixture;
    conducting a cross-linking treatment to the formed powder mixture by exposure to ionizing radiation in an oxygen-free atmosphere or in a low-oxygen atmosphere with not more than 500 ppm oxygen at a crosslinking temperature not less than a melting point of the first powder but lower than a melting point of the second powder; and
    separating the first powder and the second powder after the cross-linking treatment.

2. The method according to claim 1, wherein the second powder comprises a powder soluble in an organic solvent and/or an inorganic solvent.

3. The method according to claim 1, wherein the second powder comprises a magnetic material.

4. The method according to claim 1, wherein prior to the cross-linking treatment, a specific gravity of the second powder is not less than double or not more than half of a specific gravity of the first powder.

5. The method according to claim 1, wherein prior to the cross-linking treatment:
    the second powder has a smaller average particle size than the first powder, and
    a mixture ratio (or volume ratio) of the second powder to the first powder is not less than 2 in a ratio of the second powder/the first powder.

6. The method according to claim 1, wherein prior to the cross-linking treatment:
    the second powder has a larger average particle size than the first powder, and
    a mixture ratio (or volume ratio) of the second powder to the first powder is not less than 2 in a ratio of the second powder/the first powder.

7. The method according to claim 1, wherein the formed powder mixture is formed into a tablet shape before the cross-linking treatment.

8. The method according to claim 1, wherein the non-crosslinked fluororesin powder comprises a powder with an average particle size of not more than 15 μm.

9. The method according to claim 1, wherein the second powder comprises salt.

10. A method of manufacturing a crosslinked fluororesin powder, comprising:
    preparing a mixed powder comprising a non-crosslinked fluororesin powder as a first powder and a second powder;
    conducting a cross-linking treatment to the mixed powder by exposure to ionizing radiation in an oxygen-free atmosphere or in a low-oxygen atmosphere with not more than 500 ppm oxygen at a crosslinking temperature not less than a melting point of the first powder but lower than a melting point of the second powder; and
    separating the first powder and the second powder after the cross-linking treatment.

11. The method according to claim 10, wherein the non-crosslinked fluororesin powder comprises a powder with an average particle size of not more than 15 μm.

12. The method according to claim 10, wherein the second powder comprises salt.

\* \* \* \* \*